United States Patent
Costa et al.

(10) Patent No.: US 7,257,468 B1
(45) Date of Patent: Aug. 14, 2007

(54) APPARATUS AND METHOD FOR MEASURING DYNAMIC PARAMETERS FOR A DRIVEN WHEEL

(75) Inventors: George Costa, 58 Beacon Hill Ct., Lynn, MA (US) 01902; Kenneth Banning Avery, Ipswich, MA (US)

(73) Assignee: George Costa, Middleboro, MA (US)

( * ) Notice: Subject to any disclaimer, the term of this patent is extended or adjusted under 35 U.S.C. 154(b) by 111 days.

(21) Appl. No.: 11/072,131

(22) Filed: Mar. 4, 2005

(51) Int. Cl.
*G06F 19/00* (2006.01)

(52) U.S. Cl. ............................................. 701/1; 701/35
(58) Field of Classification Search ...................... None
See application file for complete search history.

(56) References Cited

U.S. PATENT DOCUMENTS

| | | | |
|---|---|---|---|
| 4,811,612 A | 3/1989 | Mercat | |
| 4,966,380 A | 10/1990 | Mercat | |
| 5,016,478 A | 5/1991 | Mercat | |
| 5,018,392 A | 5/1991 | Mercat | |
| 5,027,303 A | 6/1991 | Witte | |
| 5,031,455 A | 7/1991 | Cline | |
| 5,065,633 A | 11/1991 | Mercat | |
| 5,167,159 A | 12/1992 | Lucking | |
| 6,199,021 B1 * | 3/2001 | Cote et al. ..................... | 702/44 |
| 6,418,797 B1 | 7/2002 | Ambrosia et al. | |
| 6,836,711 B2 | 12/2004 | Gentilcore | |
| 2005/0275561 A1 * | 12/2005 | Kolda et al. ........... | 340/870.07 |

FOREIGN PATENT DOCUMENTS

DE 3722728 8/1988

OTHER PUBLICATIONS

Polar Electro Inc, http:\www.polar-heatrate-monitors.com/polar_power_kits.htm.

* cited by examiner

*Primary Examiner*—Michael J. Zanelli

(57) ABSTRACT

A measuring apparatus and method for measuring dynamic parameters in a driven bicycle wheel are described. Parameters which are measured are; driven torque, angular velocity, angular acceleration, lateral angular acceleration, and applied power of the driven wheel. The measuring apparatus is affixed to the rear driven cog(s) of a bicycle wheel. One or more strain sensing elements affixed to the rear driven cog(s) detect the applied driven torque. Three or more acceleration sensing integrated circuits are used to determine angular velocity, angular acceleration, and lateral angular acceleration of the driven rear cog. These circuits reside on the primary electronics board and are affixed to the rear driven cog; hence they rotate along with the driven rear cog. Power applied to the driven wheel is derived from the torque and angular velocity measurements of the invention. These performance variables will aid a competitive cyclist to evaluate and observe progress in his or her physical training.

3 Claims, 7 Drawing Sheets

Figure 1:
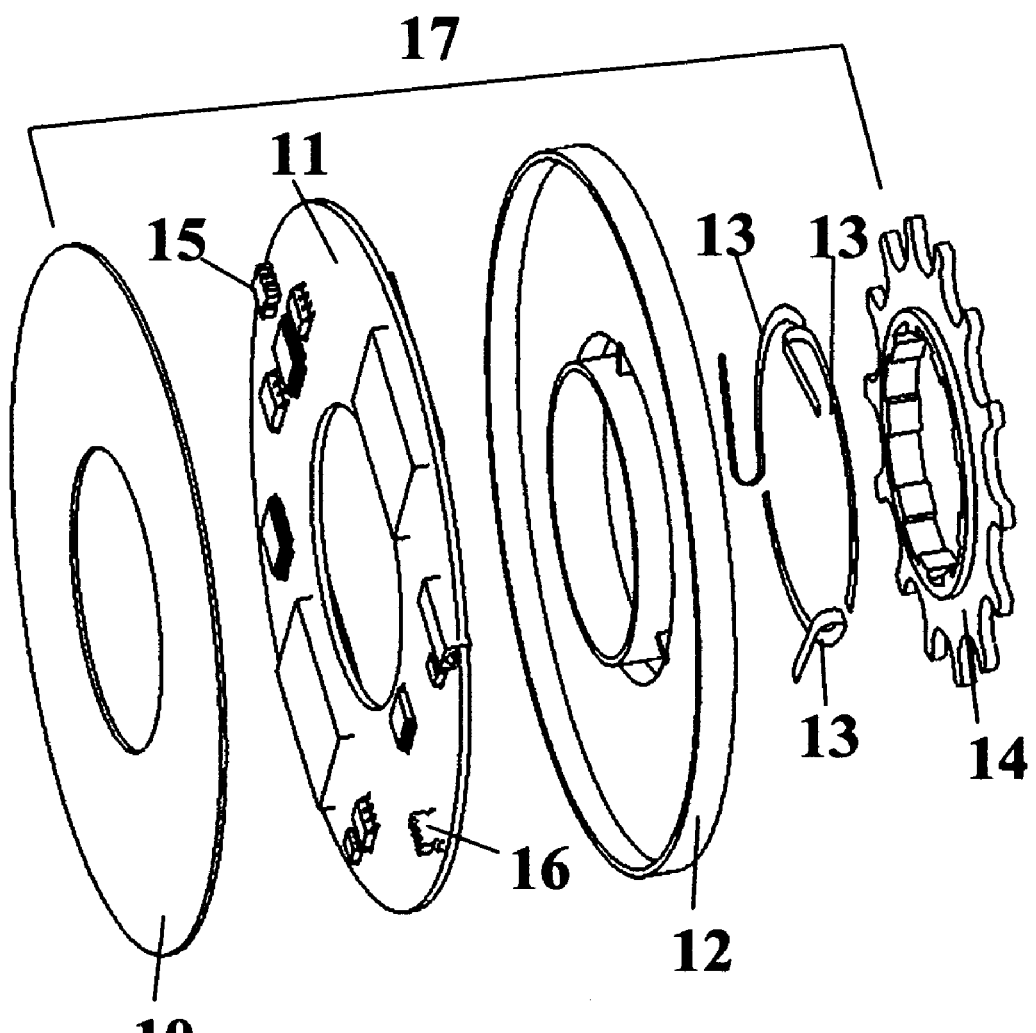

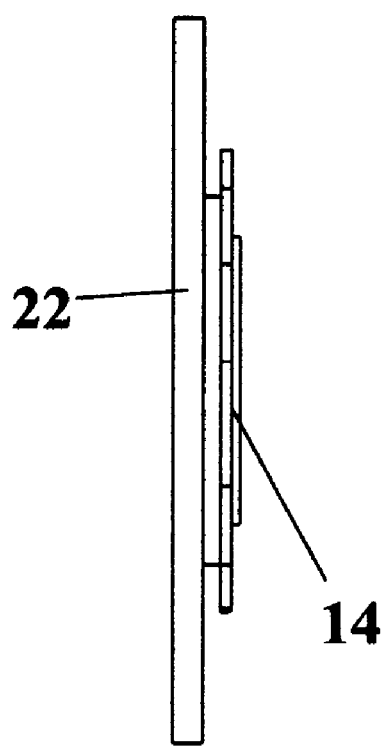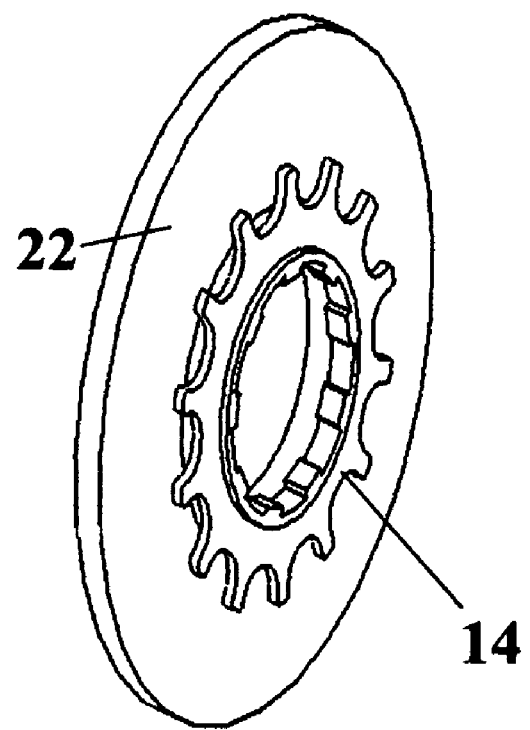
Fig. 7    Fig. 8

APPARATUS AND METHOD FOR MEASURING DYNAMIC PARAMETERS FOR A DRIVEN WHEEL

BACKGROUND OF INVENTION

Dynamic parameter measurement devices for bicycles have been implemented in various ways. Prior art exists primarily in the measurement of torque and driven wheel angular velocity. Of this prior art, torque measurement and angular velocity have been implemented in the bicycle hub, cranks, chain, pedals, and spokes. All of the prior art references determine angular velocity thru the means of a reed type magnetic switch or a low-resolution optical encoder. Angular velocity measurements taken using such methods provide updates of wheel speed too infrequently to use this data for evaluation of dynamic power applied to the rear wheel during sprint events.

Torque measurement is typically achieved in the prior art thru the use of wire bonded resistive strain gauges. The approach to mounting of these strain gauges in the prior art has typically resulted in measurements, which are subjected to errors due to undesired strains imposed on the particular object to which the gauge is bonded too. Resistive type wire bonded strain gauges perform a point-to-point measurement of the strain, which may not be fully representative of the strain imposed across the entire object being stressed. In addition, these devices require power in order to measure a change in voltage due to strain induced resistance changes.

There has been no evidence of prior art, which claims to measure centripetal acceleration or lateral angular acceleration of the rear driven wheel. It is apparent that measurements of this type would not be possible given the current state of the art in angular velocity apparatus and methods.

The invention disclosed in U.S. Pat. No. 6,418,797 consists of a device, which measures power applied to the rear wheel thru the rear hub of a bicycle. The invention uses resistive wire bond strain gauges and a reed type wheel velocity sensor to determine power applied to the rear wheel. As described previously these methods of measuring torque and wheel velocity cannot determine instantaneous power applied to the rear wheel of a bicycle. In addition implementation of U.S. Pat. No. 6,418,797 implies that a dedicated bicycle wheel is required in order to use the device disclosed in the invention to measure power output of a rider. This prevents the user from easily transferring the device to different wheels of varying sizes. The invention of U.S. Pat. No. 6,418,797 does not provide the user the capability of measuring instantaneous angular acceleration or lateral angular acceleration of the rear driven wheel. It is apparent that the invention described in U.S. Pat. No. 6,418,797 cannot measure dynamic parameters associated with a driven bicycle wheel.

There exists prior art, which appears to have been commercialized before any pending patent applications have either been filed or approved at the time of this writing by the authors. The device is a power measurement device manufactured by Polar Electro, Inc. The device uses a sensor mounted below the chain of a bicycle, which measures the frequency of oscillation of the chain under applied load. This technique is similar to how an individual tunes a guitar string. When load is applied to the chain this changes the $1^{st}$ natural frequency of the chain under tension. If one knows the mass of the chain and measures this frequency it is relatively simple to determine the tension present in the chain. This method presents problems when the chain has added mass due to containments such as mud, grease, etc. Shifts in natural frequency, which directly influence the computation of chain tension, can occur if added mass is present at the time of data acquisition. In addition the device requires a chain system, which contains significant slack and therefore is not adaptable to single speed-tensioned systems. Velocity measurement is achieved in this system through the use of a pulley, which rides along with the chain. The speed of the pulley is measured through perforated holes in the pulley and a sensing unit, which measures the time at which these perforations pass the sensing unit. This system produces velocity signals, which are proportional and controlled by the rotational speed of the pulley. This limits the maximum sample rate to the speed of the pulley multiplied by the number of perforations. High sample rates are not possible due to hardware limitations of the product. Taking the product of chain tension and chain velocity derives power applied to the chain and hence the rear wheel. The product offered by Polar does not provide the user the capability of measuring instantaneous angular acceleration or lateral angular acceleration of the rear driven wheel or chain. It is apparent that this product offered by Polar cannot measure dynamic parameters associated with a driven bicycle wheel.

The invention disclosed in German Patent DE 3722728 consists of a device, which measures power applied to the cranks of a bicycle. The invention uses resistive wire bond strain gauges and a reed type velocity sensor or a low-resolution encoder to determine power applied to the cranks of a bicycle. As described previously these methods of measuring torque and crank velocity cannot determine instantaneous power applied to the cranks of a bicycle. In addition implementation of German Patent DE 3722728 implies that dedicated bicycle cranks are required in order to use the device disclosed in the invention to measure power output of a rider. This prevents the user from easily transferring the device to different bicycles. The invention of German Patent DE 3722728 does not provide the user the capability of measuring instantaneous angular acceleration or lateral angular acceleration of the bicycle. It is apparent that the invention described in German Patent DE 3722728 cannot measure dynamic parameters associated with a bicycle.

The invention disclosed in U.S. Pat. No. 6,836,711 utilizes a high resolution optical encoder to overcome many of the deficiencies of the prior art. Despite the inventions high resolution optical encoder implementation the invention produces data at the same rate as wheel rotation, thus limiting the maximum achievable sample rate to a integer multiple of the wheel rotation. This severely limits the ability to control the rate at which a user records sensory information. The invention of U.S. Pat. No. 6,836,711 shares the same characteristic problems as the prior art already mentioned in that the hardware selected to measure angular speed dictates the maximum rate at which data can be collected, which is not desirable. This invention claims to measure the rotational displacement of the wheel as a function of time. Thus it is clear to see that two quantities are being measured and used in the computation of angular velocity and angular acceleration. Each of the measured quantities, rotational displacement and time will each have an associated measurement error. In order to compute angular velocity ($1^{st}$ derivative) and angular acceleration ($2^{nd}$ derivative) these independent errors must be propagated through the computations thus resulting in a final product, which is inherently less accurate than the original measurements intended. Further errors could be induced due to the use of a high resolution optical encoder which are susceptible to mounting and alignment induced errors. Implementation of a system like this requires sophisticated calibration routines to ensure the alignment of the device is within specification. Lastly, implementation of this invention requires that the sensor has surfaces that move independently with respect to each other, thus requiring a rotating seal to eliminate containments to the electronics. The invention of U.S. Pat. No. 6,836,711 does not provide the user the capability of measuring torque generated or instantaneous lateral angular acceleration of the bicycle; therefore it is impossible to compute applied power to the driven wheel. It is apparent that the invention described in U.S. Pat. No. 6,836,711 cannot measure all dynamic parameters associated with a bicycle driven wheel.

BACKGROUND OF INVENTION—OBJECTS AND ADVANTAGES

Accordingly one of several objects and advantages of our invention is the ability to measure true dynamic parameters associated with a driven bicycle wheel. All prior art describes angular velocity measurements which exhibit hardware imposed data acquisition limitations. For example U.S. Pat. No. 6,418,797 uses a magnetic type reed switch to measure angular velocity. Measurements using this type of technology are limited to infrequent updates of wheel angular velocity and thus resulting in infrequent updates of applied power. Our invention solves this problem of the prior art through the use of a centripetal acceleration measurement in which angular velocity can be directly computed. The implementation of our invention does not affect the rate at which data is sampled, thus it is controlled and deterministic. That is to say the invention does not have features that marry the data to the driven wheel rotations. The centripetal acceleration measurement provides continuous correlation to the wheel angular velocity and thus is only limited to the user defined sample rate imposed on the invention. The hardware and method for torque measurement also shares similar characteristics to the angular velocity measurement and thus the measurement of applied power to the bicycle wheel can also be acquired in a true dynamic manner by the proposed invention. In addition the hardware described in the prior art requires the dedicated apparatus to be mounted or assembled in a semi-permanent fashion. The invention described herein is constructed to utilize a simple inexpensive rear cog assembly, which is mounted non-permanently to the rear driven wheel. This allows competitive racers to use the invention during competition to provide feedback of the event without substituting critical race specific components such as wheels and crank assemblies.

Another object and advantage of the invention is the ability to explicitly measure velocity, angular acceleration, lateral angular acceleration and torque through specific sensors therefore eliminating computational induced errors.

Another object and advantage of the invention is that it does not contain moving components which require rotating seals, thus it is easier to prevent contamination to the electronics and sensors.

Another object and advantage of the invention is the ability to measure and acquire lateral angular acceleration of the driven bicycle wheel. To the best knowledge of the inventors there does not exist prior art, patented or commercialized, which is capable of measuring this dynamic phenomenon for a driven bicycle wheel.

This invention provides the competitive cyclist with performance data, which is invaluable to their respective training regimens. Further objects and advantages of the invention will become apparent from consideration of the drawings and ensuing description.

SUMMARY

In accordance with the present invention a dynamic parameter measuring apparatus is affixed to the rear cog assembly of a driven bicycle wheel. This apparatus senses and records driven rear cog torque, angular velocity, angular acceleration, and lateral angular acceleration of the driven wheel. The data is stored on board and later transmitted to an off board device through a wireless communication link. The rider then can evaluate his or her performance based on data recorded by the invention.

In one embodiment, the dynamic parameter measuring apparatus is affixed to a single rear cog. The apparatus described in this invention is mountable on the driven wheel. The invention described is a self-contained apparatus, which is not an integral part of the hub and/or wheel assembly. Therefore, the said invention can be used on any bicycle wheel with a compatible interface for the single rear cog assembly.

In this embodiment, strain-sensing elements are bonded to the single rear cog. These strain elements measure a signal representative of the driven torque applied to the rear wheel. The preferred strain-sensing element, ideal for this embodiment, is a Piezo film sensor. Piezo film sensors are superior to conventional resistive-type strain gauges in that; Mechanical deformation of the sensor produces a voltage, thus generating, rather than consuming power; Piezo film sensors exhibit a broad dynamic range; Signals from 0.001 Hz to 100's KHz can be resolved; Piezo film sensors measure strain across the area of the element, whereas resistive type strain gauges measure strain across two points. Piezo film sensors produce signals, which are on the order of 60 decibels higher than resistive type wire strain gauges, thus they require less amplification and are less susceptible to noise.

The rear driven cog is isolated from all outside wheel forces, except for the torque that is applied to the cog. Therefore, the measurements indicative of strain are isolated, and are a true value of torque applied to the driven wheel.

The said invention uses a novel method of determining angular velocity. Conventional means of angular velocity measurement for a bicycle is to use a reed type switch sensor. This method uses a magnet attached to the spokes, as it passes by the reed switch the magnet closes the contacts and a circuit measures the time between sequential closures of the contacts. This provides a once per wheel revolution update of the angular velocity. The method of determining angular velocity of the said invention uses an accelerometer ($A_1$, FIG. 5) mounted internally to the device, which is configured to measure centripetal acceleration of the wheel. From this centripetal acceleration measurement angular velocity can be computed at any time using the following relationship.

$$\omega = (A_1/r)^{1/2}$$

where:  $\omega$; Computed Angular Velocity
$A_1$; Measured Centripetal Acceleration
r; Mounting Radius of the Centripetal Accelerometer The said invention includes a secondary accelerometer ($A_2$, FIG. 5) configured to measure angular acceleration. Angular acceleration is computed through the following relationship.

| | |
|---|---|
| where: | $\alpha = A_2/r$ |
| | $\alpha$; Computed Angular Acceleration |
| | $A_2$; Measured Acceleration |
| | r; Mounting Radius of the Accelerometer |

The said invention includes a third accelerometer ($A_3$, FIG. 5) configured to measure lateral angular acceleration, parallel to the axis of rotation of the driven wheel, due to side to side rocking motion induced during sprinting efforts by the rider. Amplitude and phase measurement of this motion can be used to investigate proper pedaling techniques.

In another embodiment, the dynamic parameter measuring apparatus is affixed to a rear multi-cog assembly. The apparatus described in this invention is mountable on the driven wheel. The invention described is a self-contained apparatus, which is not an integral part of the hub and/or wheel assembly. Therefore, the said invention can be used on any bicycle wheel with a compatible interface for the rear multi-cog assembly.

Electronics used in the said invention are of a conventional type typically associated with small portable data acquisition modules. These include but are not limited to microprocessors, EEPROM, RAM, A/D converters, wireless communication chips and signal amplifying circuits. Unique to this invention is the incorporation of acceleration sensing on different axes, which relates directly to dynamic performance of the driven wheel. Surface mount micro machined accelerometers are becoming popular in everyday consumer electronics and are intended for use in the said invention. The said invention is not restricted to any number of 1, 2, or 3 axis accelerometers circuits.

The present invention offers a serious athlete the ability to monitor and evaluate the dynamic parameters associated with their bicycle riding. Related work and prior art fall short on measuring true dynamic parameters. To the best knowledge of the said inventors, the invention is the first to incorporate real time dynamic measurement of a driven wheel, in particular wheel acceleration. It is believed that combining the use of the invention with physical training will greatly improve the athlete's performance in competition.

DRAWINGS—FIGURES

The following is a description of the figures, which illustrate the invention. The drawings are not to scale and are meant to convey the intent of the invention.

FIG. 1. is an exploded perspective view of the invention, which highlights key design features.

Figure 2:
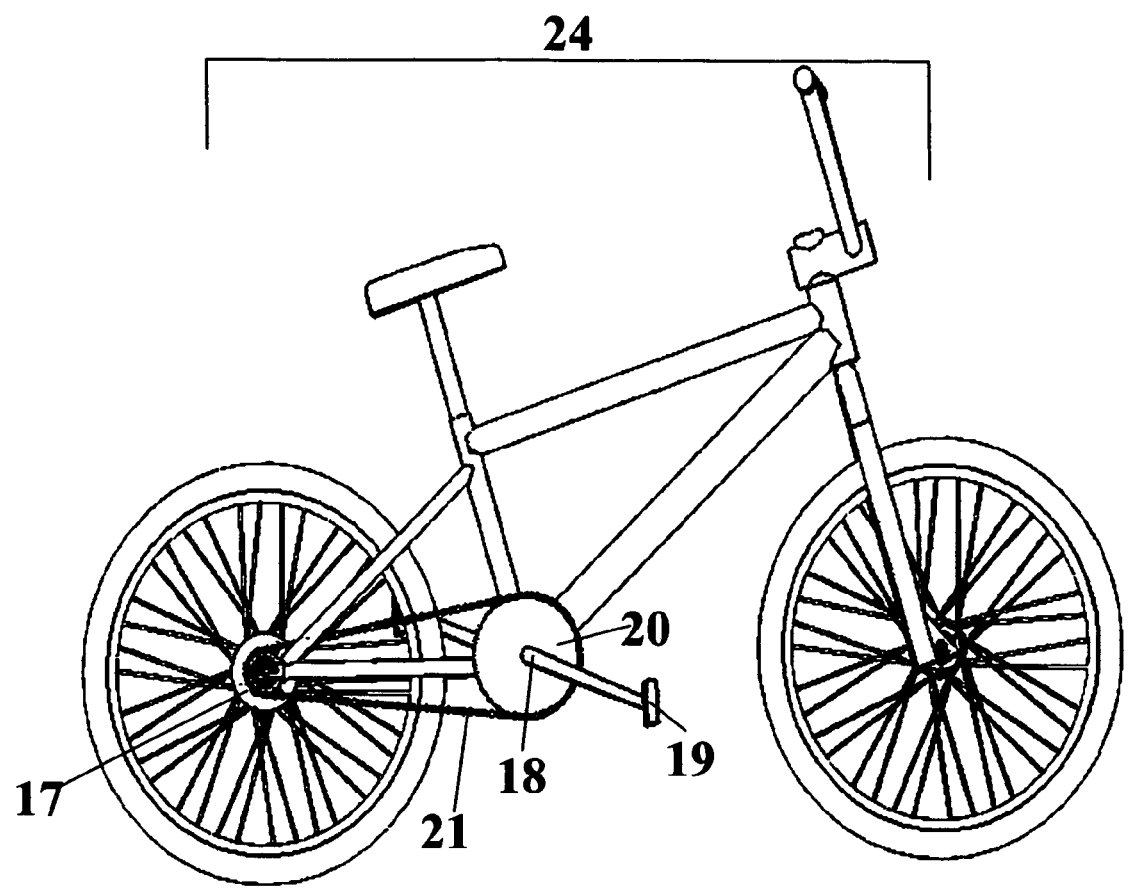

FIG. 2. contains a pictorial view of a bicycle equipped with a preferred embodiment of the invention.

Figure 3:
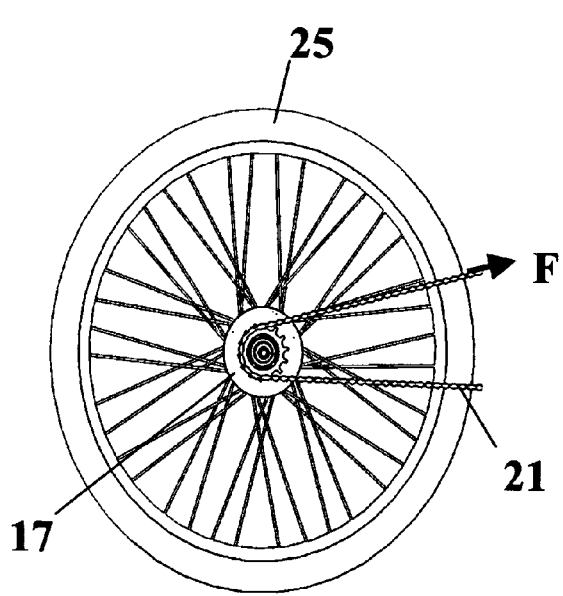

FIG. 3. contains a pictorial side view of a rear bicycle wheel equipped with a preferred embodiment of the invention.

Figure 4:
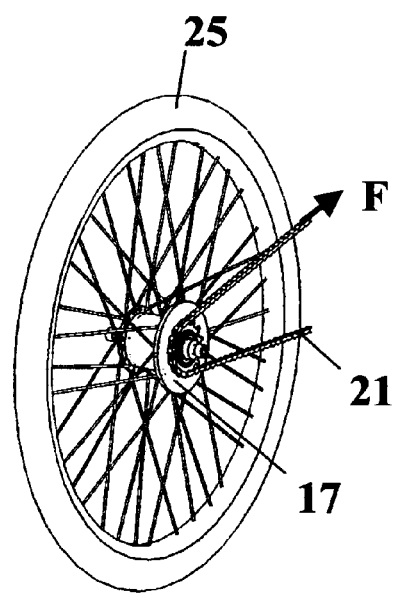

FIG. 4. contains a pictorial isometric view of a rear bicycle wheel equipped with a preferred embodiment of the invention.

Figure 5:
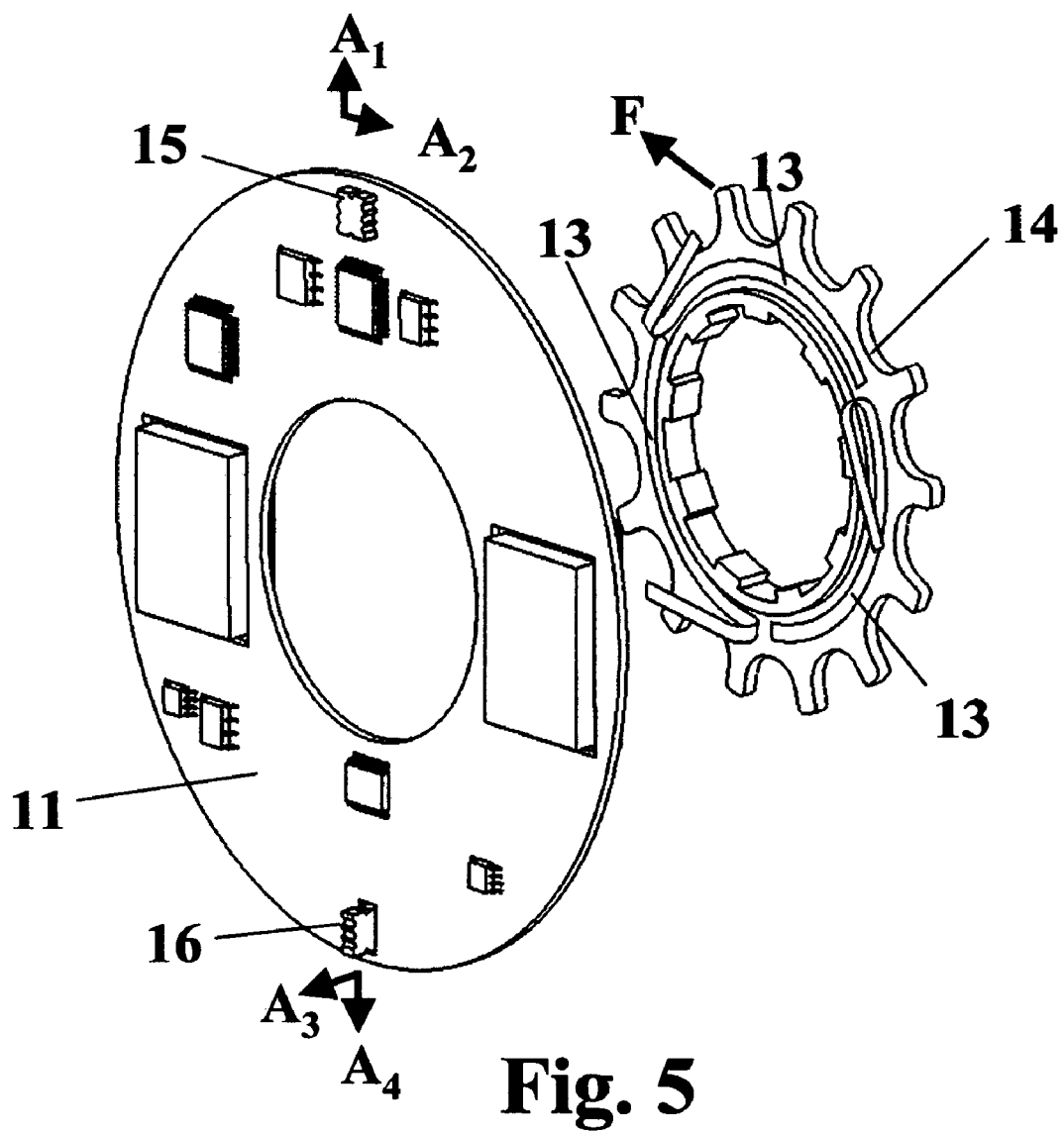

FIG. 5. is an exploded isometric view of the inventions key features, which highlights the strain sensing and accelerometer components.

Figure 6:
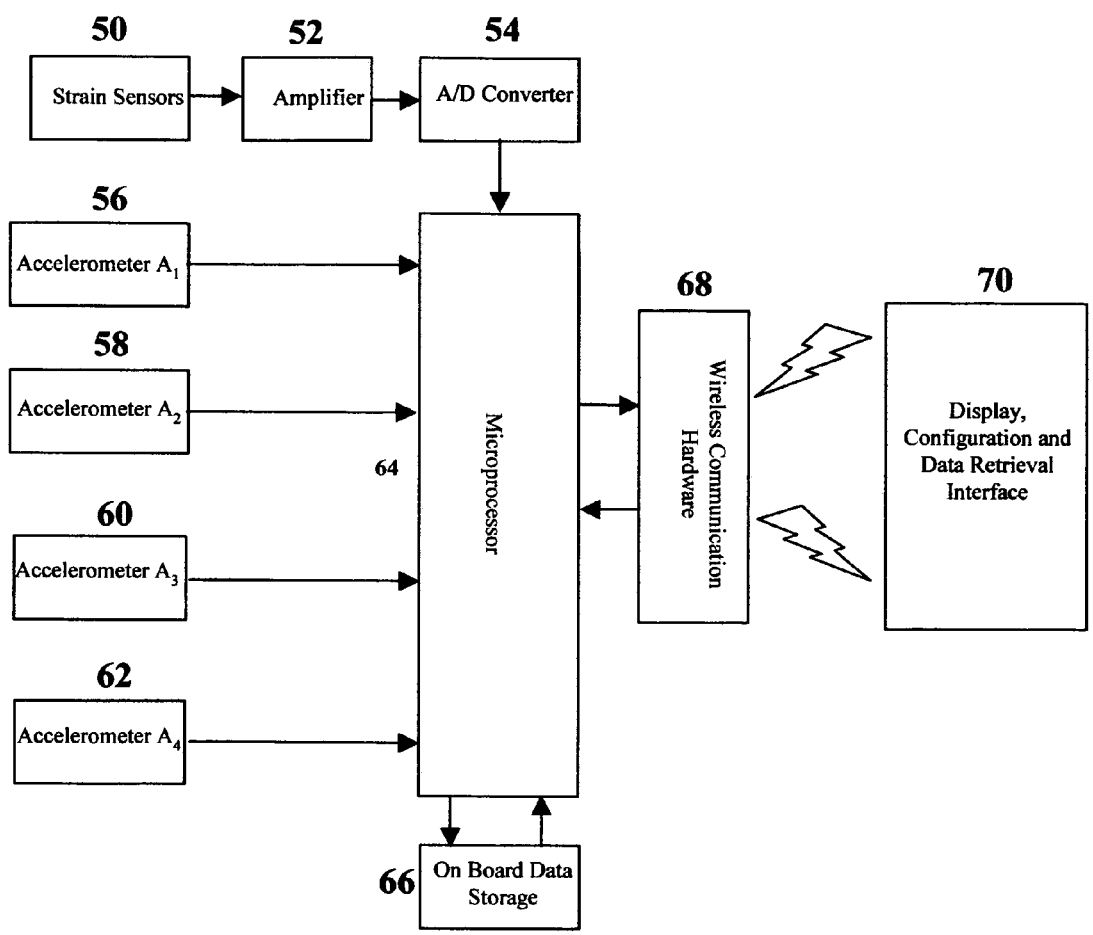

FIG. 6. contains a schematic of the data acquisition process of one embodiment of the invention. The schematic demonstrates the ability of the invention to acquire dynamic performance samples taken from the strain sensing elements and accelerometer sensors. This data is acquired through an on-board microprocessor and temporarily contained in on-board data storage. A user then can initiate a wireless communication link to the said invention and retrieve the dynamic performance data for further post processing.

FIG. 7. is a side perspective view the preferred embodiment of the invention.

FIG. 8. is a isometric perspective view the preferred embodiment of the invention.

Figure 9:
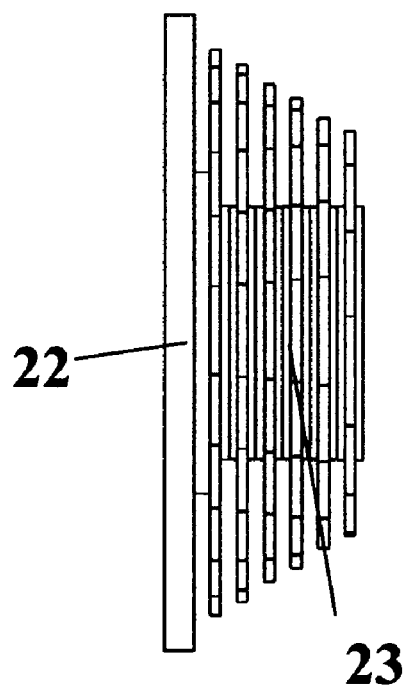

FIG. 9. is a side perspective view of an additional embodiment of the invention.

Figure 10:
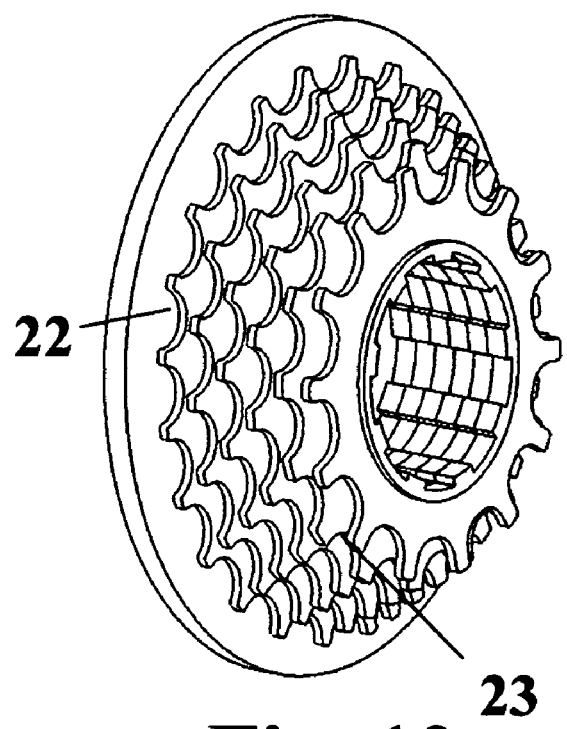

FIG. 10. is a isometric perspective view of an additional embodiment of the invention.

DRAWINGS-Reference Numerals

| | |
|---|---|
| 10 Electronics Enclosure Cover | 11 Electronics Board |
| 12 Electronics Enclosure | 13 Strain Sensing Elements |
| 14 Rear Driven Cog | 15 $A_1$ & $A_2$ Accelerometer Component |
| 16 $A_3$ & $A_4$ Accelerometer Component | 17 Bicycle Dynamic Parameter Measuring Apparatus |
| 18 Bicycle Driving Crank | 19 Bicycle Driving Pedal |
| 20 Bicycle Driving Front Cog | 21 Bicycle Driving Chain |
| 22 Sensor Package | 23 Multi Cog Rear Driver |
| 24 Bicycle | 25 Rear Bicycle Wheel |
| 50 Strain Sensor Schematic Symbol | 52 Electronic Amplifier Symbol |
| 54 Analog to Digital Symbol | 56 Accelerometer $A_1$ Symbol |
| 58 Accelerometer $A_2$ Symbol | 60 Accelerometer $A_3$ Symbol |
| 62 Accelerometer $A_4$ Symbol | 64 Microprocessor Symbol |
| 66 On Board Data Storage Symbol | 68 Wireless Communication Symbol |
| 70 Display/Data Retrieval Device Symbol | |

DETAILED DESCRIPTION OF THE PREFERRED EMBODIMENTS OF THE INVENTION

FIG. 1 is an exploded perspective view of the Bicycle Dynamic Parameter Measuring Apparatus 17. The Bicycle Dynamic Parameter Measuring Apparatus 17 contains a multitude of piezo strain sensing elements 13, which are bonded, adhered, or mechanically affixed to a single rear driven cog 14. These strain sensing elements are connected by an electrical means to the electronics board 11. The electronics board 11 contains accelerometer integrated circuit components 15, 16. Electronics board 11 and strain sensing elements 13 are enclosed by electronics enclosure 12 and electronics enclosure cover 10. These enclosures, 10 and 12, protect and seal the sensors 15,16,13 from environmental contamination.

FIG. 2 is a schematic pictorial view of a bicycle 24 equipped with the Bicycle Dynamic Parameter Measuring Apparatus 17. Torque is transmitted to bicycle 24 through pedal 19 to the crank 18, to the front cog 20, to the chain 21, and to the driven rear cog 14 of the Bicycle Dynamic Parameter Measuring Apparatus 17.

FIG. 3 contains a pictorial side view of a rear bicycle wheel 25 equipped with the Bicycle Dynamic Parameter Measuring Apparatus 17.

FIG. 4 contains a pictorial isometric view of a rear bicycle wheel 25 equipped with the Bicycle Dynamic Parameter Measuring Apparatus 17. Piezo strain sensing elements 13 measure the applied driven chain force F through mechanical deformation of the rear driven cog 14. This applied driven chain force F is the linear equivalent of the applied rotational torque, which is transmitted to bicycle 24 through pedal 19, to the crank 18, to the front cog 20, to the chain 21, and to the driven rear cog 14 of the Bicycle Dynamic Parameter Measuring Apparatus 17.

FIG. 5 is an exploded isometric view of the sensor orientation and placement of the Bicycle Dynamic Parameter Measuring Apparatus 17. This mechanical deformation due to the applied driven chain force F generates a voltage on the piezo strain sensing elements 13. This voltage is transmitted to the electronics board 11 and stored for later analysis. The applied driven chain force F propels the rear bicycle wheel 25 and induces an angular velocity measured by accelerometer integrated circuits $A_1$ and $A_4$, which are contained within accelerometer integrated circuit components 15 and 16 respectively. The applied driven chain force F propels the rear bicycle wheel 25 and induces an angular acceleration measured by accelerometer integrated circuit $A_2$, which is contained within accelerometer integrated circuit component 15. Sprinting efforts by the rider induce side to side rocking motion which a component of this motion is parallel to the axis of rotation of the rear bicycle wheel 25 and measured as a lateral angular acceleration through accelerometer integrated circuit $A_3$, contained within accelerometer integrated component 16.

FIG. 6 is the preferred embodiment of the schematic electrical block diagram of the electronic circuitry of the Bicycle Dynamic Parameter Measuring Apparatus 17. The electronic circuitry is used to detect torque, angular velocity, angular acceleration, and lateral angular acceleration of the rider.

As shown in the preferred embodiment, Piezo strain sensors 50 detect distortions in the rear driven cog 14. These mechanical distortions directly applied to the Piezo strain sensors 50 generate a voltage indicative of strain in the rear driven cog 14. These voltage signals are conditioned by amplifier 52 to produce full scale voltage signals to be read by an analog to digital converter 54. Analog to digital converter 54 translates the voltage signals indicative of strain into a digital format for the microprocessor 64. The microprocessor 64 transmits the data to an onboard memory storage device such as an EEPROM, RAM, etc. This data will remain in memory until the user decides to retrieve this data, which is indicative of the applied torque to the rear driven wheel 25.

As shown in the preferred embodiment, accelerometer ($A_1$) 56 detects centripetal acceleration in the rear driven cog 14. This centripetal acceleration is directly proportional to the angular velocity of the rear driven cog, given by:

$$\omega = (A_1/r)^{1/2}$$
where: $\omega$; Computed Angular Velocity
$A_1$; Measured Centripetal Acceleration
r; Mounting Radius of the Centripetal Accelerometer This centripetal acceleration generates a square wave voltage signal whose duty cycle varies based on the sensed acceleration. The microprocessor 64 is capable of measuring the duty cycle of accelerometer $A_1$ 56 without additional circuitry. The microprocessor 64 transmits the duty cycle data to an onboard memory storage device such as an EEPROM, RAM, etc. This data will remain in memory until the user decides to retrieve this data, which is indicative of the applied angular velocity to the rear driven wheel 25.

Power is derived from the measurement of strain and angular velocity of the rear driven cog 14. The product of these two quantities is directly proportional to the instantaneous mechanical power applied to the rear driven cog 14.

As shown in the preferred embodiment, accelerometer ($A_2$) 58, detects angular acceleration in the rear driven cog 14. This angular acceleration given by:

$$\alpha = A_2/r$$
where: $\alpha$; Computed Angular Acceleration
$A_2$; Measured Acceleration
r; Mounting Radius of the Accelerometer This angular acceleration generates a square wave voltage signal whose duty cycle varies based on the sensed acceleration. The microprocessor 64 is capable of measuring the duty cycle of accelerometer $A_2$ 58 without additional circuitry. The microprocessor 64 transmits the duty cycle data to an onboard memory storage device such as an EEPROM, RAM, etc. This data will remain in memory until the user decides to retrieve this data, which is indicative of the applied angular velocity to the rear driven wheel 25.

As shown in the preferred embodiment, accelerometer ($A_3$) 60 detects lateral angular acceleration parallel to the axis of rotation of the rear driven cog 14. This lateral angular acceleration generates a square wave voltage signal whose duty cycle varies based on the sensed acceleration. The microprocessor 64 is capable of measuring the duty cycle of accelerometer $A_3$ 60 without additional circuitry. The microprocessor 64 transmits the duty cycle data to an onboard memory storage device such as an EEPROM, RAM, etc. This data will remain in memory until the user decides to retrieve this data, which is indicative of the applied angular velocity to the rear driven wheel 25.

As shown in the preferred embodiment, accelerometer ($A_4$) 62, detects centripetal acceleration in the rear driven cog 14. This centripetal acceleration is directly proportional to the angular velocity of the rear driven cog, given by:

$$\omega = (A_4/r)^{1/2}$$
where: $\omega$; Computed Angular Velocity
$A_4$; Measured Centripetal Acceleration
r; Mounting Radius of the Centripetal Accelerometer This centripetal acceleration generates a square wave voltage signal whose duty cycle varies based on the sensed acceleration. The microprocessor 64 is capable of measuring the duty cycle of accelerometer $A_4$ 62 without additional circuitry. The microprocessor 64 transmits the duty cycle data to an onboard memory storage device such as an EEPROM, RAM, etc. This data will remain in memory until the user decides to retrieve this data, which is indicative of the applied angular velocity to the rear driven wheel 25.

Accelerometer ($A_4$) 62 is purposefully mounted 180 degrees apart from accelerometer ($A_1$) 56. This accelerometer arrangement simplifies computation of the angular velocity measurement given by.

$$\omega = (((A_1 - A_4)/2 + A_4)r)^{1/2};$$

where:
- $\omega$; Computed Angular Velocity
- $A_1$; Measured Centripetal Acceleration
- $A_4$; Measured Centripetal Acceleration
- r; Mounting Radius of the Centripetal Accelerometer The above equation is used to remove the cyclical variation in centripetal acceleration due to gravity. Signals $A_1$ 56 and $A_4$ 62 are comprised of a cyclical AC component (gravity) and a DC component (centripetal acceleration). By mounting accelerometers $A_1$ 56 and $A_4$ 62, 180 degrees out of phase with each other, cyclical variations can be directly subtracted in order to produce the DC component of the signal representative of centripetal acceleration. This method of computation of the centripetal acceleration data allows the microprocessor to perform this calculation with limited computational resources, though it is understood that the post processing of the data can be performed internal to the microprocessor 64 or external by the display interface 70.

All of the data measured by the Bicycle Dynamic Parameter Measuring Apparatus 17 is initially processed by microprocessor 64 before being sent to on board data storage device 66. Data remains at this location until the user initiates communication to the said invention through a display/data retrieval interface 70. The said interface can be implemented in many forms such as a Personal Data Assistant (PDA), Laptop Computer, bicycle mounted display unit, etc. The display/data retrieval interface 70 communicates to the Bicycle Dynamic Parameter Measuring Apparatus 17 through a wireless commutation link 68. The said wireless communication link 68 can be implemented in many forms such as Bluetooth, RF, etc. It is understood that in the preferred embodiment of the said invention that the preferred display/data retrieval interface 70 is a PDA and that preferred wireless communication link 68 is Bluetooth.

FIG. 7. is a side perspective view the preferred embodiment of the invention. FIG. 7 is presented to display the final form of the said invention.

FIG. 8. is a isometric perspective view the preferred embodiment of the invention. FIG. 8 is presented to display the final form of the said invention.

FIG. 9. is a side perspective view of an additional embodiment of the invention. This particular embodiment contains multiple rear driven cogs 23. This embodiment is for use in conjunction with multi-speed bicycles. FIG. 9 is presented to display the final form of the said invention.

FIG. 10. is a isometric perspective view of an additional embodiment of the invention. FIG. 10 is presented to display the final form of the said invention.

The presented invention shall allow competitive bicycle racing athletes to monitor their performance during training efforts and/or competitions. Athletes now will have the ability to determine the level of angular velocity, angular acceleration, torque, applied power, and lateral angular acceleration induced during sprinting efforts. While the above description contains many specificities these should not be construed as an exemplification of one preferred embodiment thereof. Accordingly, the scope of the invention should be determined not by the embodiment(s) illustrated, but by the appended claims and their legal equivalents.

We claim:

1. Apparatus for measuring and recording dynamic parameters for a driven wheel, wherein said apparatus is non-permanently mountable to the driven wheel, said apparatus comprising:
   (a) a mechanical distortion member adapted to be drivingly interconnected between a driving force input stage and a driven wheel output stage, and a sensing means directly connected to the mechanical distortion member for conversion of mechanical distortions to electrical signals indicative of the applied torque to said mechanical distortion member;
   (b) at least one centripetal accelerometer, which rotates in conjunction with the driven wheel, for sensing the effects of dynamic angular velocity applied to the driven wheel;
   (c) a tangential accelerometer, which rotates in conjunction with the driven wheel, for sensing the effects of dynamic angular acceleration applied to the driven wheel;
   (d) a tangential accelerometer, which rotates in conjunction with the driven wheel and is oriented parallel to the rotational axis of the driven wheel, for sensing the effects of dynamic lateral angular acceleration applied to the driven wheel; and,
   (e) means for recording the sensed signals indicative of applied torque, angular velocity, angular acceleration and lateral angular acceleration of the driven wheel.

2. A method for measuring and recording dynamic parameters for a driven wheel, said method comprising the steps of:
   (a) using a mechanical distortion member adapted to be drivingly interconnected between a driving force input stage and a driven wheel output stage and converting sensed mechanical distortions into electrical signals indicative of the applied torque to said mechanical distortion member;
   (b) sensing the effects of dynamic angular velocity applied to the driven wheel using a pair of centripetal accelerometers, which rotate in conjunction with the driven wheel, wherein the centripetal accelerometers are oriented 180 degrees out of phase with respect to one another to eliminate the effects of gravity imposed on computation of angular velocity;
   (c) sensing the effects of dynamic angular acceleration applied to the driven wheel using a tangential accelerometer, which rotates in conjunction with the driven wheel;
   (d) sensing the effects of dynamic lateral angular acceleration applied to the driven wheel using a tangential accelerometer, which rotates in conjunction with the driven wheel and is oriented parallel to the rotational axis of the driven wheel; and,
   (e) recording the sensed signals indicative of applied torque, angular velocity, angular acceleration and lateral angular acceleration of the driven wheel.

3. The method for measuring and recording dynamic parameters for a driven wheel of claim 2, further comprising:
   computing the power applied to the driven wheel as the product of the applied torque and the angular velocity.

* * * * *